Sept. 4, 1962 AKIRA YOMIYAMA ET AL 3,052,522
METHOD FOR THE RECOVERY OF SELENIUM
Filed Nov. 17, 1959
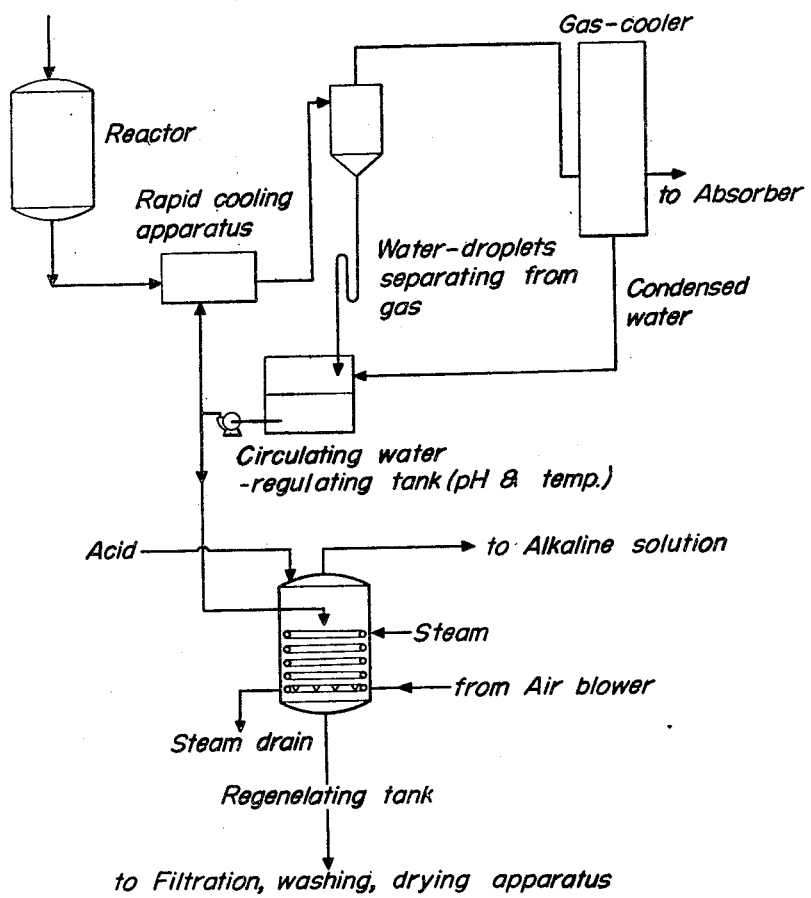
INVENTORS
AKIRA YOMIYAMA
SHIGERU YONEKAWA
BY
Wenderoth, Lind & Ponack
attys.

3,052,522
METHOD FOR THE RECOVERY OF SELENIUM
Akira Yomiyama and Shigeru Yonekawa, Tokyo, Japan, assignors to Asahi Kasei Kogyo Kabushiki Kaisha, Osaka, Japan, a corporation of Japan
Filed Nov. 17, 1959, Ser. No. 853,630
Claims priority, application Japan Sept. 4, 1959
3 Claims. (Cl. 23—209)

This invention relates to a method for the recovery of selenium or selenium compounds used in the production of unsaturated aldehydes or nitriles from unsaturated hydrocarbons.

In a conventional process which comprises contacting olefin and molecular oxygen with an oxidation catalyst to form unsaturated aldehyde and then, if desired, reacting the resulting unsaturated aldehyde with ammonia in the presence of a suitable catalyst, elementary selenium or selenium oxide can be successfully used as oxidizing catalyst, as well known heretofore. The initially added selenium or selenium oxide which may be in gaseous state would be removed after completion of the reaction, together with the gas component out of the reaction system, and accordingly it is not an exaggeration to say that the recovery as well the reuse of such selenium or selenium oxide may govern the economical value of the above said process and will also serve for the improvement of labor hygiene in plants.

In a method for the recovery of selenium catalyst as heretofore disclosed, the reaction-completed gas is indirectly cooled with a suitable cooling medium in a suitable apparatus, e.g. a heat exchanger, until vapor phase selnium or selenium compounds are condensed to their solid form suspended in the gas, and then the solid selenium or selenium compound is enforced to be crystallized on a cooled internal wall of the apparatus. In the commercial production of unsaturated aldehydes or nitriles, however, such method which requires huge apparatus and complicated change-over means has a poor recovery yield and is disadvantageous and difficult to carry out in practice.

It is accordingly a main object of the present invention to provide a novel method for the recovery of selenium catalyst having been utilized in a process for the conversion of olefine into unsaturated aldehyde, by which new method the above difficulties are completely avoided. Other objects, features, capabilities and advantages comprehended by the present invention will be apparent from the description and claims which follow.

The accompanying drawing shows the flow diagram of a suitable embodiment for carrying out the present invention. Now the present invention will be explained in detail with reference to the diagram.

As will be understood from the flow diagram, a process of the present invention usually comprises two steps, one of which is collecting waste selenium catalyst (selenium or the compound thereof) in an aqueous solution circulated and the other is regenerating (or separating) the selenium or selenium compound from the said solution. More specifically, the present invention may be successfully carried out as hereinbelow.

In the first step, the reacted gas which contains selenium and selenium compound in gaseous form is directly contacted with water in a rapid-cooling apparatus having the capability of collecting fine solid particles, such apparatus involving cyclone scrubber, peabody scrubber, venturi scrubber, etc. While a portion of water introduced in the apparatus is vaporized, the major portion is contained as water droplets in the gas which is subsequently passed through a waterseparating apparatus to remove the water droplets. The water thus separated from the gas contains selenium or selenium compound; after its pH and temperature has been adjusted, it is introduced again, together with fresh water, if need be, into the aforesaid cooling apparatus so as to effect circulation. On the other hand, the gas from which the water droplets have been removed is further cooled by means of a conventional cooling apparatus until water vapor contained therein is condensed, and then introduced into an apparatus for absorbing unsaturated nitrile in the gas. The water resulting from condensation of the water vapor may be combined either as it is with the aforesaid circulating water or after eliminating unsaturated nitrile as well as ammonia therefrom with fresh air. Thus, the selenium or selenium compound can be continuously accumulated in a circulating water, without any substantial loss of available gas components. In this step, circulation of water used for the collection of selenium or selenium compound may advantageously decrease the content of unsaturated nitrile dissolved and increase the dissolving capacity of selenium or selenium compound collected, whereby the subsequent treatment for the separation of selenium or selenium compound can be more readily conducted.

In order to effect the desirable collection of selenium or selenium compound in this stage, the circulating water should be maintained at a temperature of from normal temperature to 50° C. and at a pH within the range of from 7 to 9. When exceeding the specified temperature, the total loss of unsaturated nitrile as available component will become greater, because the unsaturated nitrile is decomposed as soon as it is dissolved, so that the amount of unsaturated nitrile dissolved is only apparently decreased. If the temperature is kept within the specified range, the loss may be negligible because the decomposition of unsaturated nitrile is suppressed in spite of the fact that a relatively greater amount is dissolved. Further if the circulating water has a pH above 9, decomposition of the nitrile dissolved will be disadvantageously accelerated, and if the pH is below 7, part of the selenium or selenium compound will be suspended in its solid state and an elementary selenium desired can hardly be regenerated from such suspension. Moreover, excessive ammonia would be so undesirably fixed that it cannot be purged, and at the same time the equipment would suffer from corrosion. Finally, when this step is carried out using a circulating water which meets the specified conditions, the following advantages can be obtained: a possible minimum loss of available component that is unsaturated nitrile; an increased content of selenium being in such state that it easily generates an elementary selenium; and the possibility of recovering excessive ammonia as ammonia.

In the second step, elementary selenium is regenerated from the circulating water which has a substantial selenium content and which has been taken from the foregoing first step. More in detail, this step may be conducted as follows. A circulating water which has reached a relatively high selenium content is led from the preceding step into a closed vessel, and then air is blown into the liquor for a considerably long period of time (e.g. about 1 to about 10 hours). While blowing in air, hydrochloric or nitric acid is added to attain a concentration of 2 to 12 percent by weight, and during this period, at least for one hour, the temperature of the liquor should be maintained at 40° to 80° C. Thus elementary selenium can be precipitated out from the liquor (aqueous solution); the precipitate is then filtered, washed and dried in a conventional manner to yield 99%-pure selenium. On the other hand, air which has been used for blowing (aeration) is washed with an aqueous alkaline solution and then exhausted into atmosphere.

In the second step, air-blowing (aeration) may advantageously accelerate the precipitation rate of elementary selenium and decrease the required amount of acid. Also it may improve the purity of selenium to be recovered. If the temperature during aeration is lower than the specified range, the precipitation rate will be decreased, and if the temperature is higher, the selenium obtained shows undesirable properties and insufficient purity. If the acid concentration is too low, precipitation of selenium is incomplete, and if too high, selenium once precipitated is redissolved. In some cases, it is very desirable to treat the liquor with active carbon prior to regeneration in this step in order to obtain an exceptionally highly pure selenium.

Now the following examples will show how the invention may be carried out, but the invention is not to be construed as limited thereto.

*Example 1*

A gas mixture of 2.5 percent by volume of propylene and 97.5 percent by volume of air was heated up to 310° C. and then passed on a molten selenium bath maintained at the same temperature to have a selenium content in gas of 1.50 gr. per normal cubic meter. Then the gas was brought into contact with a copper oxide catalyst (carrier: silica gel) heating at 320° C. to form a gas containing 2.1 percent by volume of acrolein. The gas formed was added with a 250° C.-preheated ammonia to have a content of 3.4 percent by volume, and then passed through a 420° C.-heated catalyst mainly comprising phosphomolybdic acid, whereby a gas containing 1.80 percent by volume of acrylonitrile was obtained. This reaction-completed gas contained 1.50 gr./Normal m.$^3$.

The thus obtained gas was rapidly cooled to about 50° C. by contacting directly with water by means of a venturi scrubber. Then the gas was led into a cyclone to effect the separation of water droplets formed, and thereafter further cooled with water to about 20° C. in a packed column. Water which had been separated in the cyclone was combined with that which had been condensed in the packed column, and then introduced again into the venturi scrubber to effect circulation. After the procedures, the gas was found to have the following composition:

|  | Gas, immediately after completing the reaction | Gas, after passing through cooling cycle |
|---|---|---|
| Selenium, gr./N m$^3$ | 1.50 | 0.03 |
| Acrolein, percent by volume | 1.80 | 1.72 |
| Carbon dioxide, percent by volume | 1.96 | 1.91 |
| Ammonia, percent by volume | 1.55 | 1.48 |

By repeating the above cyclic operation for about 12 hours, a selenium content of the circulating water was found to be 15.5 gr./l.

If a condensed water obtained in the packed column was aerated with fresh air prior to mixing to a circulating water, a gas coming off from the cooling cycle was found to be an acrylonitrile content of 1.75 percent by volume.

*Example 2*

Two hundred liters of a circulating water of Example 1, which had reached to have a selenium content of 15.5 gr./l., were introduced into a lead-lining reaction vessel. The water was added, while blowing air therein, with 12 l. of concentrated sulfuric acid having a specific gravity of 1.7, and then the solution was maintained at 80° C. for two hours. Selenium compound contained in the solution was decomposed thereby to precipitate an elementary selenium. The solution was cooled to room temperature, and thereafter the precipitate was filtered, washed with water and dried to give 3.18 kgr. of pure selenium in 99.4% yield.

*Example 3*

Two hundred liters of a circulating water of Example 1, which contained 15.5 gr./l. of selenium, was added with 10 l. of 30% hydrochloric acid, and the resulting solution was maintained at 60° C. for 3 hours, with air-blowing (or aeration). Selenium thus precipitated was filtered, washed and dried. Selenium thus obtained weighed 3.10 kilograms. Yield of recovery was 96.6%.

*Example 4*

While air-blowing, a circulating water of Example 1 was added with nitric acid to have the concentration of 7% by volume and then maintained at 50° C. for 2 hours. Selenium recovered was 3.17 kgr. and yield of recovery was 99.0% as calculated from the initial selenium content of 3.20 kgr.

*Example 5*

In order to determine the most suitable conditions for the regeneration of selenium from a circulating water of Example 1, a series of tests was carried out using sulfuric acid. The results are set forth in the following table.

| Run No. | Conditions for regeneration | | | | Result | | | Appearance of selenium obtained |
|---|---|---|---|---|---|---|---|---|
|  | H$_2$SO$_4$ conc., percent by weight | Temperature, °C. | Time, hrs. | Aeration | Initial conc., Se, gr./l. | Final conc., Se, gr./l. | Yield, percent |  |
| 1 | 1 | 60 | 3 |  | 15.5 | 13.5 | 13 | Good. |
| 2 | 8 | 60 | 3 |  | 15.5 | 0.3 | 98 | Do. |
| 3 | 12 | 60 | 3 |  | 15.5 | Trace | 100 | Do. |
| 4 | 4 | 60 | 3 |  | 15.5 | 1.6 | 90 | Tarry, impure material contained. |
| 5 | 8 | 20 | 4 |  | 13.8 | 5.5 | 60 | Good. |
| 6 | 8 | 80 | 4 |  | 13.8 | Trace | 100 | Do. |
| 7 | 8 | 90 | 4 |  | 13.8 | Trace | 100 | Considerable amount of tarry impure material contained. |
| 8 | 7 | 60 | 2 |  | 15.1 | Trace | 100 | Good. |
| 9 | 8 | 60 | 0.5 |  | 15.1 | 11.3 | 25 | Do. |
| 10 | 8 | 60 | 1.5 |  | 15.1 | Trace | 100 | Excellent. |

NOTE.—In Run Nos. 8 and 10, aeration was carried out. In Run No. 10, pretreatment with active carbon was carried out.

The table indicates that the above-specified ranges of temperature, aeration and sulfuric acid amount are most desirable.

The thus obtained elementary selenium can be repeatedly used as it is for carrying out a reaction desired.

What we claim is:

1. A method for recovering selenium from a gas containing selenium together with unsaturated aldehyde and nitrile produced from the oxidation of unsaturated hydrocarbons, comprising the steps of (a) spraying water into a stream of the gas to collect the selenium, the water having a pH of 7 to 9 and a temperature of from ambient to 50° C., (b) separating the resultant selenium-containing water from the resultant gas-liquid mixture in a gas-liquid separation zone, (c) adding an acid selected from the group consisting of hydrochloric, nitric and sulphuric acids to the selenium-containing water to obtain an acid concentration of 2 to 12% by weight, and (d) maintaining the resultant acid-water solution at a temperature of 40° C. to 80° C. to thereby precipitate elemental selenium.

2. The method of claim 1, wherein the resultant gas-liquid mixture is subjected to cyclone separation, thereby separating the selenium-containing water from the gas.

3. A method for recovering selenium from a gas containing selenium together with unsaturated aldehyde and nitrile produced from the oxidation of an unsaturated hydrocarbon, comprising the steps of (a) spraying water into a stream of gas to collect the selenium, the water having a pH of 7 to 9 and a temperature of from ambient to 50° C., (b) separating the resultant selenium-containing water from the resultant gas-liquid mixture in a gas-liquid separation zone, (c) regulating the separated water to maintain its pH between 7 and 9 and its temperature between ambient and 50° C., (d) recirculating said water until a substantial amount of selenium is adsorbed therein, (e) adding an acid selected from the group consisting of hydrochloric, nitric and sulphuric to the selenium-containing water to obtain an acid concentration of 2 to 12% by weight, and (f) maintaining the resultant acid-water solution at a temperature of 40° C. to 80 C. to thereby precipitate elemental selenium.

References Cited in the file of this patent

UNITED STATES PATENTS

| | | |
|---|---|---|
| 1,915,703 | Towne et al. | June 27, 1933 |
| 2,949,339 | Marvin | Aug. 16, 1960 |

FOREIGN PATENTS

| | | |
|---|---|---|
| 713,334 | Great Britain | Aug. 11, 1954 |